(12) United States Patent
Yang et al.

(10) Patent No.: US 9,143,442 B2
(45) Date of Patent: Sep. 22, 2015

(54) FLEXIBLE AND SCALABLE VIRTUAL NETWORK SEGMENT PRUNING

(71) Applicant: Cisco Technology, Inc., San Jose, CA (US)

(72) Inventors: Yibin Yang, San Jose, CA (US); Alex Tsai, Cupertino, CA (US); Vinay Parameswarannair, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 13/711,919

(22) Filed: Dec. 12, 2012

(65) Prior Publication Data

US 2014/0161131 A1  Jun. 12, 2014

(51) Int. Cl.
*H04L 12/741* (2013.01)
*H04L 12/801* (2013.01)
*H04L 12/46* (2006.01)

(52) U.S. Cl.
CPC ............ *H04L 45/54* (2013.01); *H04L 12/4641* (2013.01); *H04L 12/4658* (2013.01); *H04L 47/12* (2013.01)

(58) Field of Classification Search
None
See application file for complete search history.

(56) References Cited

U.S. PATENT DOCUMENTS

| 6,085,238 A | 7/2000 | Yuasa et al. |
| 7,792,058 B1 * | 9/2010 | Yip et al. ...................... 370/255 |
| 2001/0025318 A1 * | 9/2001 | Higashiyama ................ 709/238 |
| 2005/0190788 A1 * | 9/2005 | Wong et al. ................... 370/466 |
| 2006/0245439 A1 * | 11/2006 | Sajassi .......................... 370/400 |
| 2007/0171918 A1 * | 7/2007 | Ota et al. ................. 370/395.53 |
| 2008/0186981 A1 * | 8/2008 | Seto et al. ................ 370/395.53 |

OTHER PUBLICATIONS

Notification of Transmittal of the International Search Report and the Written Opinion of the International Searching Authority, or the Declaration, dated Mar. 6, 2014 from corresponding International Application No. PCT/US2013,074681, 11 pages.

* cited by examiner

*Primary Examiner* — Christopher Crutchfield
(74) *Attorney, Agent, or Firm* — Parker Ibrahim & Berg LLC; James M. Behmke; Stephen D. LeBarron

(57) ABSTRACT

A segment within a virtual network is identified as being supported by a segment bundling device. The segment within the virtual network supports a first host connected to a first bridging device and a second host connected to a second bridging device. The segment bundling device is used to receive virtual network address information describing the virtual network segmentation identifier (ID) for the segment used for receiving virtual network traffic for the first and second host. A segment bundling table associating a bundle ID with the virtual network segmentation identifier based on the upper ID and the lower ID of the virtual network ID is generated by the segment bundling device. The segment bundling device is used to distribute the segment bundling table to traffic forwarding devices in the virtual network that interface with the first bridging device and the second bridging device.

21 Claims, 5 Drawing Sheets

| Segmentation ID | Bundle ID 1 | Bundle ID 2 |
|---|---|---|
| ........ | | |
| 0x555.111 | 10 | 10 |
| ........ | | |
| 0x555.222 | 20 | 20 |
| ........ | | |
| 0x666.111 | 10 | 10 |
| ........ | | |
| 0x666.222 | 20 | 20 |
| ........ | | |
| 0x777.333 | 30 | 35 |
| ........ | | |

FLEXIBLE AND SCALABLE VIRTUAL NETWORK SEGMENT PRUNING

TECHNICAL FIELD

The following disclosure relates generally to segment pruning within virtual networks.

BACKGROUND

The virtual network is a new architecture that is used to provide solutions for cloud computing service providers. For example, an organization may have a need for a computer networking solution, such as a data center. Instead of building and maintaining their own physical data center, they may lease a virtual data center provided by a cloud computing service provider on a virtual network segment.

BRIEF DESCRIPTION OF THE FIGURES

FIG. 3 illustrates an exemplary segment bundling table.

DESCRIPTION OF EXAMPLE IMPLEMENTATIONS

Overview

Figures 1A, 1B:
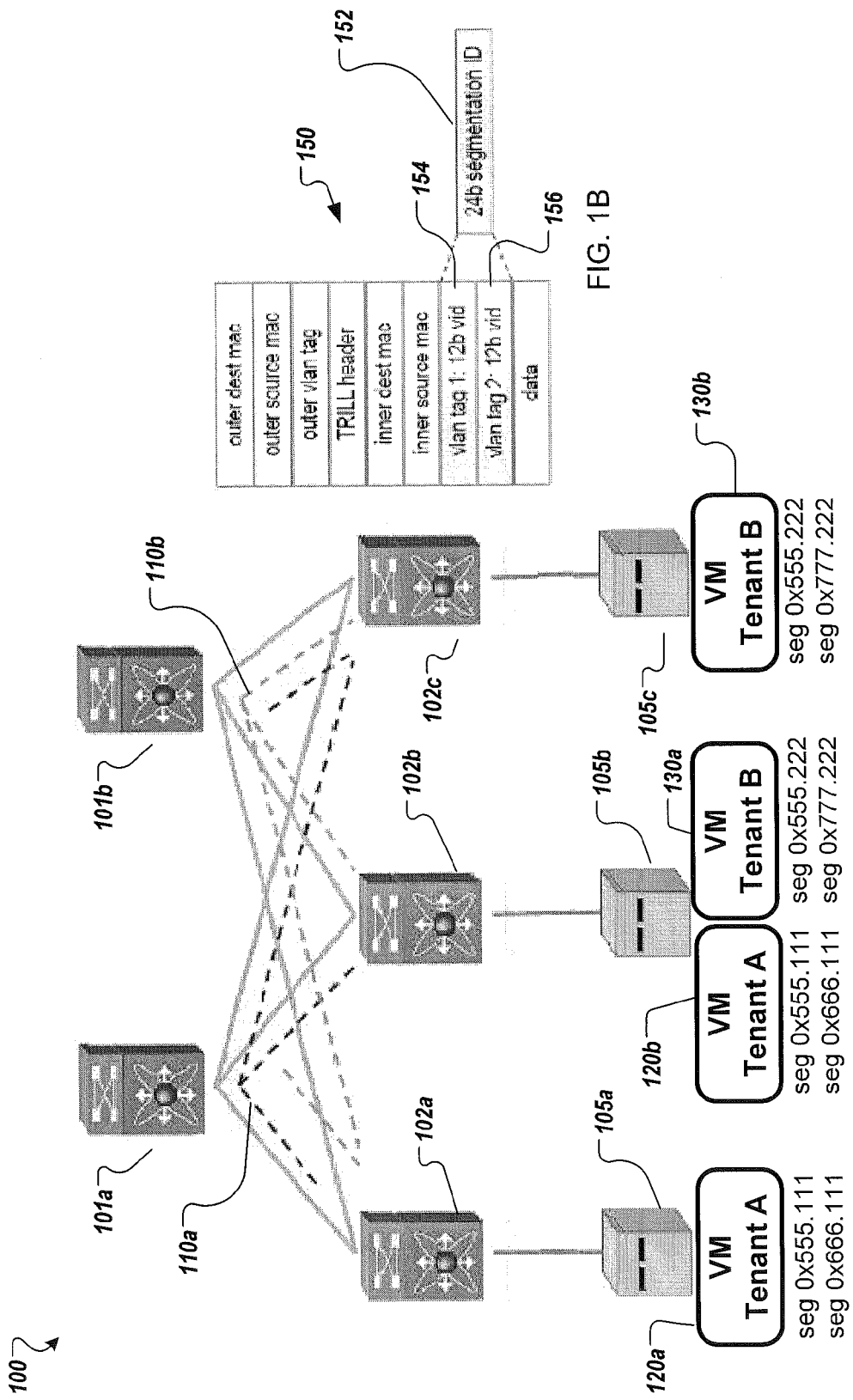
FIG. 1A illustrates an exemplary virtual network.
FIG. 1B illustrates an exemplary data frame used within a virtual network.

In a general aspect, a segment within a network is identified as being supported by a segment bundling device. The segment within the network supports a first host connected to a first bridging device and a second host connected to a second bridging device.

Virtual network address information describing the virtual network segmentation identifier (ID) for the segment is received using the segment bundling device. The virtual network segmentation id, including an upper ID and a lower ID, is used to receive virtual network traffic for the first and second host. A segment bundling table associating a bundle ID with the virtual network segmentation identifier based on the upper ID and the lower ID of the virtual network ID is generated using the segment bundling device. And the segment bundling device is used to distribute the segment bundling table to traffic forwarding devices in the network that interface with the first bridging device and the second bridging device.

DETAILED DESCRIPTION OF EXAMPLE EMBODIMENTS

Changes in the makeup of a virtual network often result in reduced network performance or storage and processing loads. Furthermore, there is often little or no consistency between where, within a network, a given address will be assigned because addresses may be allocated dynamically. Virtual network resource management operations, for example, often affect virtual network address allocation within a virtual network. For example, virtual network providers routinely use virtual machine migration techniques to move operating virtual machines between one or more different host devices to save energy, operating costs and for load balancing. Because the host devices may be incorporated in different branches of the network, such changes can induce problems of excess network traffic or a need for large complicated pruning tables; resulting in either reduced network performance or large data storage and processing loads.

The disclosed process for flexible and scalable virtual network segment pruning addresses the problems of reduced network performance or storage and processing loads caused by changes in the makeup of a virtual network such as virtual network resource management operations. The process incorporates three methods of performing network segment pruning to reduce or eliminate excessive network traffic caused by virtual network segment changes. In addition, the process offloads much of the processing requirements from every router or router-bridge onto only a few powerful network routers or router-bridges to alleviate overall processing loads, and uses bundling tables to minimize data storage requirements related to pruning tables.

A virtual network segment typically includes traffic forwarding and bridging devices for moving data between different sections of the network. In this context, a traffic forwarding device may be a network router, a router-bridge capable of performing the functions of both a router and a bridge. Similarly, a bridging device may be a network bridge or a router-bridge. The traffic forwarding and bridging devices may each include multiple (e.g. thousands) of data ports organized into several data distribution trees. For example, the data distribution trees may be used to forward data to network devices such as servers, end-user computers.

The data may be received in the form of frames (for example, link layer frames such as Ethernet frames) or packets (for example, network packets such as Internet Protocol packets) or as some other suitable protocol data unit. The protocol data units may include virtual network segment address information indicating the intended recipients of the data within the virtual network. In some implementations the address information may be divided into two portions, for example an upper and a lower portion.

Layer two control and forwarding protocols, such as Transparent Interconnect of Lots of Links (TRILL), native Ethernet, or Cisco Systems, Incorporated's FabricPath, provide pruning features that allow the traffic forwarding devices to optimize their distribution trees. Pruning is critical for virtual network segments to avoid excessively flooding devices with unwanted network traffic.

A virtual network may provide for several different pruning methods. The pruning methods allow network devices to advertise their interest in specific addresses to the traffic forwarding and bridging devices. The advertisements allow the traffic forwarding and bridging devices to minimize the data transmitted to individual network devices.

In some implementations pruning is based on one of the virtual network segment address portions, for example the upper address portion. This method effectively creates subsets of addresses. Traffic forwarding and bridging devices may create pruning tables associating each specific upper address portion with each of its ports that are connected to a network device interested in that address portion. Pruning tables remain relatively small, but excess data is transmitted on each port.

In other implementations pruning is based on the entire virtual network segment address. Traffic forwarding and bridging devices may create pruning tables associating each specific address with each of its ports that are connected to a network device interested in that address. No excess network traffic is transmitted on each port, but pruning tables are excessively large.

In additional implementations at least one of the traffic forwarding devices is designated to generate a table (e.g. a Bundling Table) mapping addresses into bundle identities (ID). Once distributed to the network devices, the Bundling Table allows the network devices to advertise interest in traffic based on bundle IDs. Traffic forwarding and bridging devices may create pruning tables associating each specific bundle ID with each of its ports that are connected to a network device interested in that bundle ID.

In further implementations, the Bundling Table may be generated using a heuristic algorithm to optimally map the address to bundle IDs such that excess traffic is minimized and pruning tables may remain relatively small.

FIG. 1A illustrates an example of a virtual network 100. The virtual network 100 includes traffic forwarding devices 101a and 101b, bridging devices 102a-102c in communication with the traffic forwarding devices 101a and 101b, and host devices 105a-105c in communication with the bridging devices 102a-102c. Virtual network 100 also includes virtual machines 120a and 120b, operated by tenant A, running on host devices 105a and 105b and virtual machines 130a and 130b, operated by tenant B, running on host devices 105b and 105c Within virtual network 100, traffic distribution trees 110a and 110b are rooted at traffic forwarding devices 101a and 101b respectively. Traffic forwarding devices 101a and 101b are in communication with bridging devices 102a-102c. For example, the traffic forwarding devices 101a and 101b is in communication with the bridging devices 102a-102c using virtual network segment frames over a TRILL link. The traffic forwarding devices 101a and 101b may be used to perform operations such as receiving virtual network address information from other devices on the virtual network 100, forwarding network traffic within and outside of the virtual network 100, and pruning traffic distributions trees 110a and 110b, for example.

Each traffic forwarding device, 101a and 101b, may be a routing-bridge. Furthermore, each traffic forwarding device 101a and 101b may have multiple data ports and each data port may be configure to operate using different network protocols and on different data layers. Each traffic forwarding device 101a and 101b may include one or more processors configured to execute instructions stored by a computer readable medium for performing various operations, such as input/output, communication, data processing, and the like. The traffic forwarding devices 101a and 101b also may contain one or more forms of computer readable media for the storage of routing tables, network addressing data, and device reachability information, for example All three bridging devices 102a-102c are in communication with traffic forwarding devices 101a and 101b. Each bridging device 102a-102c is also in communication with at least one host device such as host devices 105a-105c. The bridging devices 102a-102c may use different layer two protocols to communicate with the traffic forwarding devices 101a and 101b and the host devices 105a-105c. For example, as noted above, communications between the bridging devices 102a-102c and the traffic forwarding devices 101a and 101b may use virtual network segment frames over a TRILL link, communications between each bridging device 102a-102c and its associated host device 105a-105c may use 802.1Q frames via an Ethernet link.

The bridging devices 102a-102c may be similar devices to the traffic forwarding devices 101a and 101b. As such, they may be a routing-bridge. Additionally, the bridging devices may be a bridge, a switch, or any other suitable network device. Furthermore, each bridging device 102a-102c may have multiple data ports and each data port may be configure to operate using different network protocols and on different data layers. Each bridging device 102a-102c may include one or more processors configured to execute instructions stored by a computer readable medium for performing various operations, such as input/output, communication, data processing, and the like. The bridging devices 102a-102c may also contain one or more forms of computer readable media for the storage of routing tables, network addressing data, and device reachability information, for example.

Host devices 105a-105c are used to host one or more virtual machines such as virtual machines 120a, 102b, 130a, and 130b and are in communication with at least one bridging device such as bridging devices 102a-102c.

Each host device 105a-105b may be a server, or any other appropriate computing device. Each host device may include one or more processors configured to execute instructions stored by a computer readable medium for performing various operations, such as input/output, communication, data processing, and the like.

Each tenant may lease or operate one or more virtual machines 120a 120b, 130a, and 130b on the virtual network 100. The virtual machines 120a 120b, 130a, and 130b may serve as a virtual data center, a virtual web server for a small or large business, or any other service that may be provided by a virtual machine. Additionally, the virtual machines 120a 120b, 130a, and 130b may emulate hardware, operating systems, or software application in order to perform a given service. Furthermore, each tenant on a virtual network may be assigned one or more virtual network segment addresses. For example, tenant A is assigned virtual network segment addresses 0x555.111 and 0x666.111 and tenant B is assigned virtual network segment addresses 0x555.222 and 0x777.222.

Virtual machines 120a, 120b, 130a, and 130b may be hosted on host devices, such as 105a-105c. In the exemplary virtual network 100 illustrated in FIG. 1A virtual machines 120a and 120b are hosted on host devices 105a and 105b. Likewise, virtual machines 130a and 130b may reside on host devices 105b and 105c. In addition, each virtual machine may be assigned one or more of their respective tenant's virtual network segment addresses. Furthermore, two or more virtual machines may be assigned the same virtual network segment address when they are operated by a single tenant. For example, virtual machines 120a and 120b are assigned tenant A's virtual network segment addresses 0x555.111 and 0x666.111 and virtual machine 130a and 130b are assigned tenant B's virtual network segment addresses 0x555.222 and 0x777.222.

FIG. 1B illustrates an exemplary data frame 150 used within a virtual network 100. The data frame 150 includes virtual network segment network addressing information such as a segmentation identification (ID) 152. (For consistency of explanation virtual network segment addresses will be referred to as segmentation IDs in the remainder of this description.) Segmentation ID 152 is further divided into an upper segmentation ID 154 and a lower segmentation ID 156.

The upper segmentation ID 154 and lower segmentation ID 156 may include 12-bit virtual local area network (VLAN) IDs carried in 802.1Q tags or any similar virtual network addressing protocol.

In an example implementation, virtual network 100 may be associated with physical data center used to provide cloud computing services to a large number of tenants. The tenants may be interested in any of the above described services capable of being implemented on a virtual machine, such as a virtual data center, a virtual web server, or a public or private virtual LAN.

In one implementation, the host devices 105a-105c may communicate the segmentation IDs assigned to any or all of the virtual machines running on the host devices 105a-105c to the bridging devices 102a-102c, such that appropriate network traffic is transmitted to the host devices 105a-105c. For example, host device 105a may communicate to the bridging device 102a, through an advertisement or similar protocol, that it is interested in network traffic containing segmentation IDs 0x555.111 and 0x666.111. A network device may be "interested" in that the device's address, or addresses of other devices in communication with the network device, is designated as belong to a broadcast domain. The host device may provide additional data regarding virtual machines. In a similar fashion, bridging device 102a may communicate those segmentation IDs to one or more of the traffic forwarding devices 101a and 101b, for example.

Figure 2:
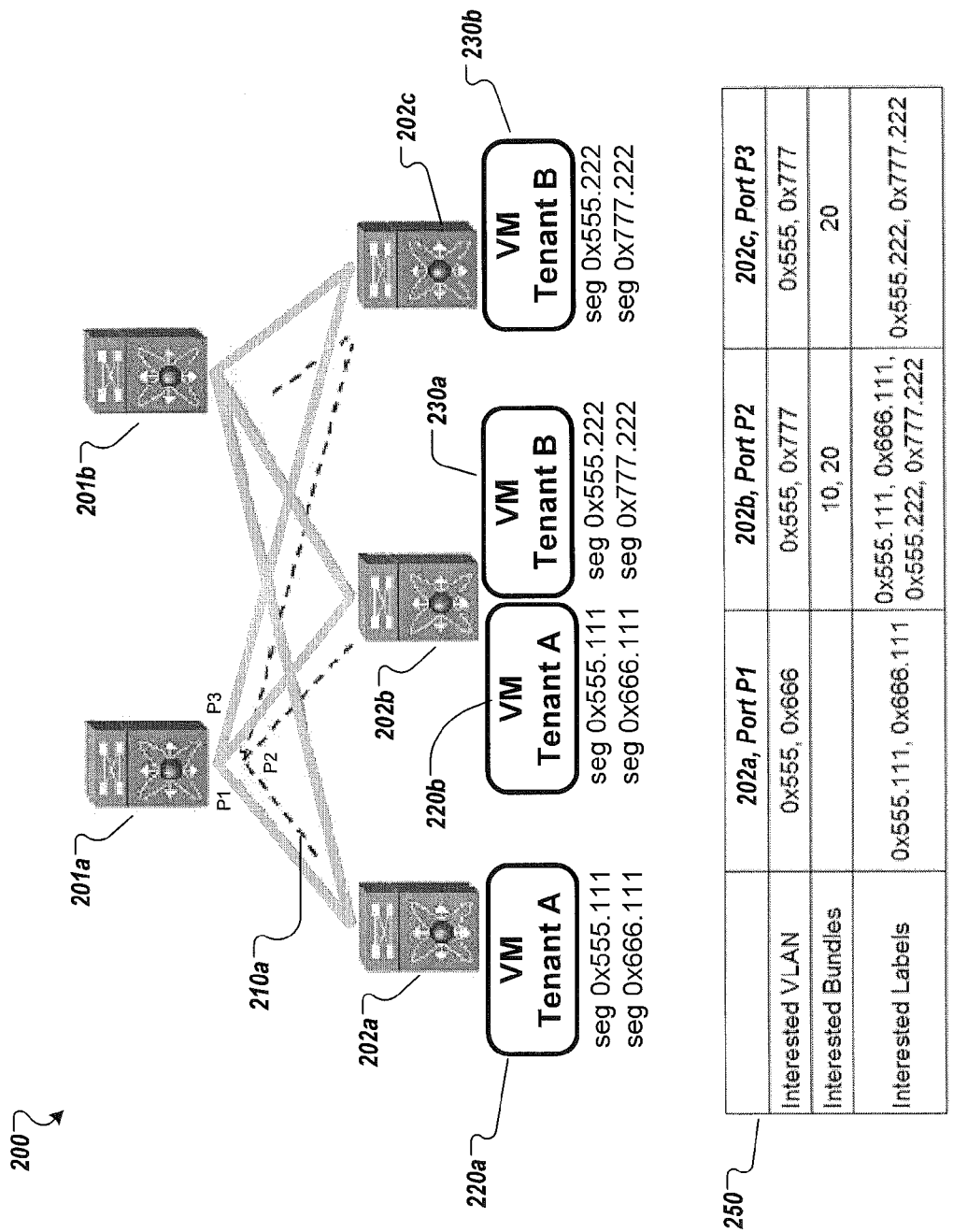
FIG. 2 is a diagram of a system illustrating segment pruning alternatives in an exemplary virtual network.

FIG. 2 is a diagram of a system illustrating segment pruning alternatives in an exemplary virtual network 200. Table 250 illustrates each of three pruning alternatives for the network devices included in virtual network segment 200. The virtual network 200 includes traffic forwarding devices 201a and 201b and bridging devices 202a-202c in communication with the traffic forwarding devices 201a and 201b. Virtual network 200 also includes virtual machines 220a, 220b, 230a, and 230b. Each of the traffic forwarding devices 201a and 201b, bridging devices 202a-202c, and virtual machines 220a, 220b, 230a, and 230b are similar to the counterparts described in FIG. 1A. Within virtual network 100, traffic distribution tree 210a is rooted at traffic forwarding device 201a. Each of the traffic forwarding devices 201a and 201b, bridging devices 202a-202c, and virtual machines 220a, 220b, 230a, and 230b are similar to their counterparts described in FIG. 1A. Furthermore, the host devices would be operating in virtual network 200, but have not been depicted in FIG. 2 to simplify the description of the pruning alternatives.

Three pruning alternatives are illustrated in FIG. 2, interested VLAN pruning, interested segmentation ID pruning, and segment bundle pruning. For illustration purposes, the pruning alternatives will be described from the perspective of traffic forwarding device 201a, but in different implementations may be performed by any or all of the traffic forwarding devices and bridging devices.

Traffic forwarding device 201a is depicted with three data ports P1, P2, and P3 each connected to bridging devices 202a, 202b, and 202c respectively. The connection may be a physical connection such as Ethernet or fiber optic cables.

Interested VLAN pruning is performed based on the upper 12 bits of the segmentation ID or the upper segmentation ID, also known as the VLAN. Traffic forwarding device 201a receives advertisements from the bridging devices indicating the VLANs in which the bridging devices are interested. An interested VLAN is a VLAN for which the bridging device receives network traffic in order to transmit the traffic to a virtual machine operating in association with the bridging device. For example, bridging device 202a advertises its interest in VLANs 0x555 and 0x666 to traffic forwarding device 201a because bridging device 202a is connected to a host supporting tenant A's virtual machine 220a. The first row of table 250 shows the VLAN advertisements sent to traffic forwarding device 201a by each of the bridging devices. In one implementation, the advertisements are made using the type-length-value (TLV) data element of a link state packet (LSP), for example using the Interested VLANs Sub-TLV format. Other formats may be used in different implementations.

Traffic forwarding device 201a may use the advertisements to build pruning tables. The pruning tables may associate the interested VLANs with data ports connected appropriate bridging devices. For example, data port P1 on traffic forwarding device 201a would be associated with VLANs 0x555 and 0x666. Traffic forwarding device 201a may then transmit any network traffic addressed to VLAN 0x555 or 0x666 on data ports P1. However, since bridging device 202b is also interested in those VLANs (see table 250) the traffic will be transmitted on port P2 as well. Though, only traffic addressed to VLAN 0x555 will be transmitted on port P3.

An advantage to this method of pruning is that pruning tables will remain relatively small because only the upper segmentation IDs are mapped to each pruning port. However, because the virtual network segment architecting is a flat structure, there is no limitation on how segmentation IDs are allocated. Therefore, situations arise such as that illustrated in table 250 where virtual machines associated with different bridging devices are allocated segmentation IDs located on the same VLANs. This results in network traffic for tenant A's virtual machines 220a and 220b being transmitted not only to bridging devices 202a and 202b, but also to bridging device 202c because both tenant A's virtual machines 220a and 220b and tenant B's virtual machines 230a and 230b have addresses contained within the same VLAN. The result is excess network flooding.

Interested segmentation ID pruning is performed based on the entire segmentation ID. Traffic forwarding device 201a receives advertisements from the bridging devices indicating the segmentation IDs in which the bridging devices are interested, based on the addresses of virtual machines associated with the bridging devices. For example, bridging device 202a would advertise to traffic forwarding device 201a that it is interested in segmentation IDs 0x555.111 and 0x666.111 because bridging device 202a is connected to a host supporting a virtual machine 220a. The second row of table 250 shows the segmentation ID advertisements sent to traffic forwarding device 201a by each of the bridging devices. In one implementation, the advertisements are made using the Interested Labels Sub-TLV format, while other formats may be used in different implementations.

Similar to the process described above, traffic forwarding device 201a may use the advertisements to build pruning tables associating the interested segmentation IDs with data ports connected to appropriate bridging devices. For example, data port P1 on traffic forwarding device 201a would be associated with segmentation IDs 0x555.111 and 0x666.111. Whereas, data port P2 would be associated with segmentation IDs 0x555.111, 0x666.111, 0x555.222 and 0x777.222, since bridging device 202b is associated with both virtual machine 220b and 230a. Traffic forwarding device 201a may then transmit any network traffic addressed to any of the segmentation IDs on the appropriate data port. For example, traffic addressed to 0x555.222 would be transmitted only on ports P2 and P3.

By employing an approach that incorporates interested segmentation ID pruning these operations may provide "perfect pruning," in that bridging devices will only be sent traffic in which they are interested. However, pruning tables may become very large because the traffic forwarding device 201a associates each segmentation ID individually with each data port within its pruning table. This approach may require large amounts of data storage, but also may provide for more efficient transmission of traffic than interested VLAN pruning.

Segment bundle pruning is performed based on a bundle ID. A segment bundling table is generated by a device in the virtual network 200 as described below in regard to FIG. 3. In short, the segment bundling table associates one or more segmentation IDs with one or more bundling IDs. The table is distributed to any or all devices in the virtual network segment capable of supporting segment bundle pruning Traffic forwarding device 201*a* receives advertisements from the bridging devices indicating the bundle IDs in which the bridging devices are interested, based the segmentation IDs of virtual machines associated with the bridging devices and the bundling table. For example, bridging device 202*b* would advertise its interest in bundle IDs 10 and 20 to traffic forwarding device 201*a* because the segmentation IDs for bridging device 202*b*'s associated virtual machines 220*b* and 230*a* may have been assigned those bundle IDs in the segment bundling table. The second row of table 250 shows the bundle ID advertisements sent to traffic forwarding device 201*a* by each of the bridging devices. Note that bridging device 202*a* is an example of a network device which may choose not to advertise interest in any bundle IDs if only a limited number of bridging device 202*a*'s interested segments belong to the bundle. Pruning for bridging device 202*a* (P1 of traffic forwarding device 201*a*) then must be performed using one of the other methods described. In one implementation, the advertisements are made using a new Interested Bundles Sub-TLV format, while other formats may be used in different implementations.

Traffic forwarding device 201*a* may use the advertisements to build pruning tables associating the interested bundle IDs with data ports connected to appropriate bridging devices. For example, data port P2 on traffic forwarding device 201*a* would be associated with bundle IDs 10 and 20. Whereas, data port P3 would be associated with bundle ID 20. Traffic forwarding device 201*a* then may transmit any network traffic addressed to any of the segmentation IDs on the appropriate data port. For example, traffic forwarding device 202*a* would map traffic containing segmentation ID 0x555.222 to bundling ID 20 based on a bundling table. It may then be transmitted on ports P2 and P3 based on a pruning table associating bundle ID with ports P2 and P3.

Segment bundle pruning seeks to optimize the advantages of the two previous types of pruning while minimizing their disadvantages. Data storage is saved because only one large table, the segment bundling table associating each segmentation ID with one or more bundling IDs, is required compared to an equivalently large pruning table for each port. And network traffic is reduced because the segment bundling table, (discussed below regarding FIG. 3) is generated to minimize data port flooding.

In some implementations, a checksum of the bundling table may be included in link state packets used to advertise a device's interested bundle IDs. For example, traffic forwarding devices may use the checksum to verify that they have consistent bundling with the sending device (i.e. that the two devices have identical bundling tables). For instance, a device that receives an incorrect checksum will not prune based on the segment bundling table or bundle IDs. The checksum may be included in a new Bundling Consistency Sub-TLV.

In another implementation pruning may be performed by using any single one or any combination of the three alternatives discussed. Pruning may also be performed using all three methods to varying degrees within a virtual network. Pruning based on VLAN may, for example, be desired for backwards compatibility or other reasons. Furthermore, a traffic forwarding device or bridging device may maintain a separate pruning table for each pruning method used or a consolidated table.

In yet other implementations the three pruning methods may be performed in virtual network segments using layer two protocols other than TRILL. For example, the pruning methods may be performed within either the native Ethernet or FabricPath protocols. In such implementations advertising may be conducted using link state packets or bridge protocol data units (BPDU) according to the appropriate protocol.

FIG. 3 illustrates an exemplary segment bundling table 300. The segment bundling table maps each segmentation ID with one or more bundling IDs. For example, segmentation ID 0x555.111 is associated with bundle ID 10 and segmentation ID 0x777.333 is associated with bundle IDs 30 and 35. Likewise, each bundle ID may be associated with multiple segmentation IDs, such as bundle ID 10 which is associated with segmentation IDs 0x555.111 and 0x666.111. In one implementation, the segment bundling table may be a global table representing every possible segmentation ID. In a second implementation the bundling table may represent a subset of possible segmentation IDs. For example, if a network protocol allocates network addresses in such a manner that some VLANs are grouped while others are distributed broadly the grouped VLANs may be excluded from the segment bundling table and pruned based on interested VLAN.

Based on interested segmentation ID information advertised by some or all of the bridging devices in a virtual network segment, a segment bundling table may be generated using a heuristic algorithm to compute an optimal or near optimal segment bundling table. The segment bundling table may be computed such that excessive flooding within the network is avoided. Further, as network conditions change, virtual machines being added, removed, or migrating to new hosts, a need may arise for the segment bundling table to be recomputed. For example, this need may be indicated by an increase in network flooding as the old bundling table proves less efficient due to the network changes. In one implementation, a flooding threshold value may be used to trigger the generation of an updated bundling table. In a second configuration, generation of an updated bundling table may be triggered by the expiration of a timer.

Figure 4:
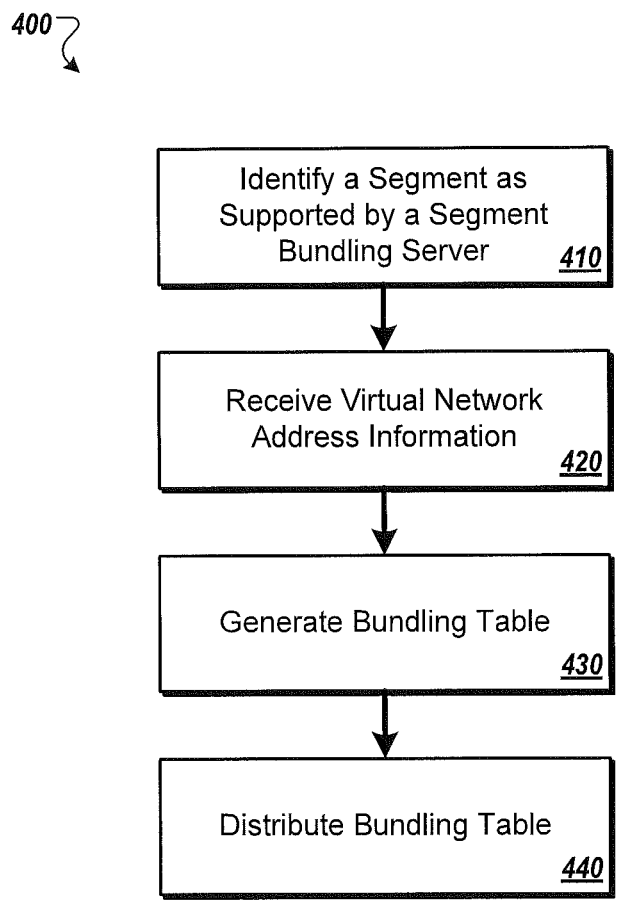
FIG. 4 is a flowchart showing an example of a process for generating and distributing a segment bundling table.

FIG. 4 is a flowchart showing an example of a process 400 for generating and distributing a segment bundling table. Briefly, the process 400 includes identifying a segment as being supported by a segment bundling device, the segment supporting a first host connected to a first bridging device and a second host connected to a second bridging device within a network; receiving, using the segment bundling device, virtual network address information describing the virtual network segmentation identifier (ID) for the segment that is used to receive virtual network traffic for the first and second host, wherein the virtual network ID comprises an upper ID and a lower ID; generating, using the segment bundling device, a segment bundling table associating a bundle ID with the virtual network segmentation identifier based on the upper ID and the lower ID of the virtual network ID; and distributing, using the segment bundling device, the segment bundling table to traffic forwarding devices in the network that interface with the first bridging device and the second bridging device.

In more detail, when process 400 begins, a virtual network segment is identified as being supported by a segment bundling device (410). The segment bundling device may be a traffic forwarding device. In some implementations, a second traffic forwarding device may be designated as a backup segment bundling device. In such an implementation, the backup segment bundling device may perform some or all of the actions performed by the segment bundling device and described herein. Furthermore, the backup segment bundling device may perform the described functions simultaneously with the segment bundling device or at different times. In other implementations, the segment bundling device may also be a powerful traffic forwarding device. For example, the segment bundling device may be a traffic forwarding device configured with powerful and fast processing capabilities and sufficient data storage such as to minimize the time required to generate bundling tables.

The segment bundling device is used to receive virtual network address information (420) used by network devices to receive traffic. Some or all of the bridging devices in the virtual network inform the segment bundling device of their interests in segmentation IDs. They may inform the segment bundling device using an Interested Labels Sub-TLV in a link state packet, for example, or using another suitable protocol.

In one implementation, a bit in the Interested Labels Sub-TLV may be reserved, for example a selective bit. The selective bit may be used to differentiate Interested Labels Sub-TLV advertisements being used to advertise information for the generation of a segment bundling table vice being used to advertise segmentation IDs for use in generating interested segmentation ID pruning tables. In such an implementation, traffic forwarding devices which are not designated as a segment bundling device may ignore Interested Labels Sub-TLV when the reserved bit indicates a that a particular Interested Labels Sub-TLV is an advertisement for generating a segment bundling table. Likewise, the same traffic forwarding device may process the Interested Labels Sub-TLV when the reserved bit indicates that a particular Interested Labels Sub-TLV is an advertisement for interested segmentation ID pruning.

A segment bundling table is generated by the segment bundling device (430) based on the received network address information; segmentation IDs in one example. The segment bundling table may be computed by the segment bundling device using a heuristic algorithm, as described above. Conversely, the segment bundling table may be computed entirely or simply edited manually by a user in another implementation.

The segment bundling device distributes the bundling table (440) to some or all of the network devices in the virtual network. Segment bundling tables may be distributed using a database distribution protocol such as VTP3 or another suitable protocol, for example. In an implementation the bundling table may be distributed only to a subset of network devices. For example, if less than all the network devices are configured to perform segment bundle pruning.

Figure 5:
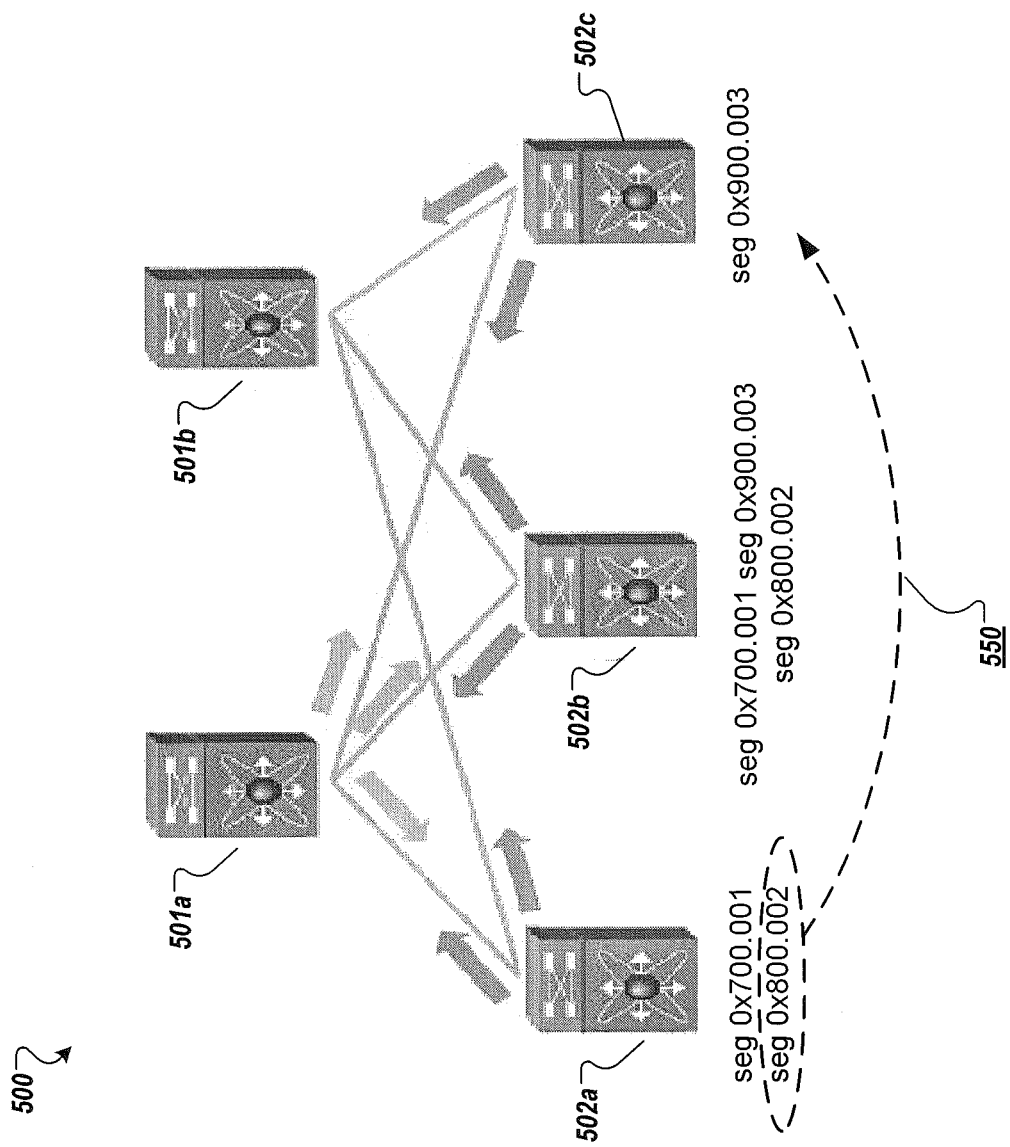
FIG. 5 is a diagram of a system illustrating a transient period during segment bundling table generation and distribution in an exemplary virtual network.

FIG. 5 is a diagram of a system illustrating a transient period during segment bundling table generation and distribution in an exemplary virtual network 500. Traffic forwarding devices 501a and 501b represent devices similar to those described in FIGS. 1 and 2. Likewise, bridging devices 502a-502c also represent devices similar to those described in FIGS. 1 and 2. In virtual network 500 traffic forwarding device 501a has been designated as a segment bundling device.

A transient period as depicted in FIG. 5 may occur upon initial network startup or when a condition indicating a need to update the segment bundling table is met, as described above regarding FIG. 3. During such a period traffic may still flow and not be disrupted within the virtual network segment 500. Segment bundle pruning may, however, be unavailable.

In one implementation, interested VLAN pruning may be performed in lieu of segment bundle pruning, during the transition period.

Initially, segmentation IDs 0x700.001 and 0x800.002 are interested in by two bridging devices 502a and 502b. Two devices are "interested" in that addresses related to each are designated as belonging to the same broadcast domain. Thus, the segment bundling device 501a may map both segmentation IDs to the same bundling ID on a first bundling table, for example bundle ID 70. Similarly, segmentation ID 0x900.003 is interested in by bridging devices 502b and 502c and therefore it may have been mapped to a second bundle ID on the first bundling table, for example bundle ID 90.

Subsequently, a change in the network configuration may occur such as a virtual machine associated with segmentation ID 0x800.002 migrating (550) from a host associated with bridging device 502a to a host associated with bridging device 502c. In such a situation, bridging device 502c may begin advertising interest in bundle ID 70 based on the first bundling table, and bridging device 502a may continue advertising interest in bundle ID 70. Excessive flooding to bridging device 502c will result as traffic addressed to segmentation ID 0x700.001 is transmitted to bridging device 502c because both segmentation ID 0x700.001 and 0x800.002 are still associated with bundle ID 70.

Once a network condition is reached, either a flooding threshold or expiration of a timer, segment bundling device 501a will generate a new bundling table. The arrows originating at the bridging devices 502a-502c represent virtual network addressing information being transmitted from the bridging devices 502a-502c to segment bundling device 501a (420) for the generation of the new bundling table. In like manner, the arrows originating at segment bundling device 501a represent the new bundling table being transmitted from segment bundling device 501a to the bridging devices 502a-502c. In an implementation, traffic forwarding device 501b may be a backup segment bundling device and may have generated an additional backup bundling table.

The new segment bundling table may remap segment 0x800.002 from bundle ID 70 to 90 because both segmentation IDs 0x800.002 and 0x900.003 are interested in by the same two bridging devices 502b and 502c. Once the new segment bundling table is distributed by segment bundling device 501a, bridging device 502c will no longer advertise its interest in bundle ID 70 and the excessive flooding from bridging device 502a may cease.

In one implementation, segment bundling device 501a may begin process 400 by receiving messages from some or all of the network devices upon the excessive flooding threshold being reached. In another implementation, a segment bundling table timer may be configured on some or all of the network devices and synchronized among them. In such an implementation the expiration of the timer would imitate the process (400) of generating a new bundling table.

The disclosed and other examples can be implemented as one or more computer program products, that is, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   identifying a segment as being supported by a segment bundling device, the segment supporting a first host connected to a first bridging device and a second host connected to a second bridging device within a network;
   receiving, using the segment bundling device, virtual network address information describing the virtual network segmentation identifier (ID) for the segment that is used to receive virtual network traffic for the first and second host, wherein the virtual network ID comprises an upper ID and a lower ID;
   generating, using the segment bundling device, a segment bundling table associating a bundle ID with the virtual network segmentation identifier based on the upper ID and the lower ID of the virtual network ID; and
   distributing, using the segment bundling device, the segment bundling table to traffic forwarding devices in the network that interface with the first bridging device and the second bridging device.

2. The method of claim 1, wherein receiving virtual network addressing information comprises receiving, within a link state packet, an Interested Bundles Sub-TLV (type-length-value) from the first or second bridging device, the Interested Bundles Sub-TLV listing bundles in which the first or second bridging device is interested.

3. The method of claim 1, wherein receiving virtual network addressing information comprises receiving, from the first or second bridging device and within a link state packet, a select bit in an Interested Labels Sub-TLV and a list of virtual network segmentation identifiers in which the first or second bridging device is interested.

4. The method of claim 3, wherein the select bit indicates that the list of virtual network segmentation identifiers should be used to forward network traffic to the first or second bridging device instead of an upper ID.

5. The method of claim 1, further comprising forwarding, by at least one of the traffic forwarding devices, traffic to the first or second bridging device for the first or second host based on (i) a bundle ID associated with the virtual network segmentation identifier in which the first or second host is interested, (ii) a particular upper ID identifying a subset of virtual network segmentation identifiers that at least one of the first or second host is interested in, or (iii) a particular virtual network segmentation identifier in which the first or second host is interested.

6. The method of claim 1, wherein generating the segment bundling table comprises generating a segment bundling table checksum,
   wherein distributing the segment bundling table comprises distributing the checksum to the traffic forwarding devices in the network so as to verify consistency in the segment bundling table, and
   further comprising:
   incorporating the checksum into a link state packet;
   distributing the link state packet to the traffic forwarding devices; and verifying, by the traffic forwarding devices, based on the checksum, that the segment bundling table previously received by the traffic forwarding devices is consistent with a traffic forwarding device that sent the link state packet.

7. The method of claim 1, wherein the virtual network segmentation identifier is encapsulated in a Transparent Interconnect of Lots of Links (TRILL) frame format.

8. The method of claim 1, wherein the virtual network segmentation identifier is encapsulated in a FabricPath frame format.

9. The method of claim 1, wherein the virtual network segmentation identifier is encapsulated in a Native Ethernet frame format.

10. An apparatus, comprising:
one or more processors; and
logic encoded in one or more tangible non-transitory machine-readable media for execution on the one or more processors, and when executed operable to:
identify a segment as being supported by a segment bundling device, the segment supporting a first host connected to a first bridging device and a second host connected to a second bridging device within a network;
receive, using the segment bundling device, virtual network address information describing the virtual network segmentation identifier (ID) for the segment that is used to receive virtual network traffic for the first and second host, wherein the virtual network ID comprises an upper ID and a lower ID;
generate, using the segment bundling device, a segment bundling table associating a bundle ID with the virtual network segmentation identifier based on the upper ID and the lower ID of the virtual network ID; and
distribute, using the segment bundling device, the segment bundling table to traffic forwarding devices in the network that interface with the first bridging device and the second bridging device.

11. The apparatus of claim 10, wherein the logic when executed to receive virtual network addressing information comprises receiving, within a link state packet, an Interested Bundles Sub-TLV from the first or second bridging device, the Interested Bundles Sub-TLV listing bundles in which the first or second bridging device is interested.

12. The apparatus of claim 10, wherein the logic when executed to receive virtual network addressing information comprises receiving, from the first or second bridging device and within a link state packet, a select bit in an Interested Labels Sub-TLV and a list of virtual network segmentation identifiers in which the first or second bridging device is interested.

13. The apparatus of claim 12, wherein the select bit indicates that the list of virtual network segmentation identifiers should be used to forward network traffic to the first or second bridging device instead of an upper ID.

14. The apparatus of claim 10, wherein the logic when executed is further operable to forward, by at least one of the traffic forwarding devices, traffic to the first or second bridging device for the first or second host based on (i) a bundle ID associated with the virtual network segmentation identifiers in which the first or second host is interested, (ii) a particular upper ID identifying a subset of virtual network segmentation identifiers that at least one of the first or second host is interested in, or (iii) a particular virtual network segmentation identifier in which the first or second host is interested.

15. The apparatus of claim 10, wherein the logic when executed to generate the segment bundling table comprises generating a checksum,
wherein the logic when executed to distribute the segment bundling table comprises distributing the checksum to the traffic forwarding devices in the network so as to verify consistency in the segment bundling table, and
wherein the logic when executed is further operable to:
incorporate the checksum into a link state packet;
distribute the link state packet to the traffic forwarding devices; and
verify, by the traffic forwarding devices, based on the checksum, that the segment bundling table previously received by the traffic forwarding devices is consistent with a traffic forwarding device that sent the link state packet.

16. A non-transitory computer-readable medium comprising instructions to cause a processor to perform operations comprising:
identifying a segment as being supported by a segment bundling device, the segment supporting a first host connected to a first bridging device and a second host connected to a second bridging device within a network;
receiving, using the segment bundling device, virtual network address information describing the virtual network segmentation identifier (ID) for the segment that is used to receive virtual network traffic for the first and second host, wherein the virtual network ID comprises an upper ID and a lower ID;
generating, using the segment bundling device, a segment bundling table associating a bundle ID with the virtual network segmentation identifier based on the upper ID and the lower ID of the virtual network ID; and
distributing, using the segment bundling device, the segment bundling table to traffic forwarding devices in the network that interface with the first bridging device and the second bridging device.

17. The non-transitory computer-readable medium of claim 16, wherein receiving virtual network addressing information comprises receiving, within a link state packet, an Interested Bundles Sub-TLV from the first or second bridging device, the Interested Bundles Sub-TLV listing bundles in which the first or second bridging device is interested.

18. The non-transitory computer-readable medium of claim 16, wherein receiving virtual network addressing information comprises receiving, from the first or second bridging device and within a link state packet, a select bit in an Interested Labels Sub-TLV and a list of virtual network segmentation identifiers in which the first or second bridging device is interested.

19. The non-transitory computer-readable medium of claim 16, wherein the select bit indicates that the list of virtual network segmentation identifiers should be used to forward network traffic to the first or second bridging device instead of an upper ID.

20. The non-transitory computer-readable medium of claim 16, further comprising forwarding, by at least one of the traffic forwarding devices, traffic to the first or second bridging device for the first or second host based on (i) a bundle ID associated with the virtual network segmentation identifiers in which the first or second host is interested, (ii) a particular upper ID identifying a subset of virtual network segmentation identifiers that at least one of the first or second host is interested in, or (iii) a particular virtual network segmentation identifier in which the first or second host is interested.

21. The non-transitory computer-readable medium of claim 16, wherein generating the segment bundling table comprises generating a segment bundling table checksum,
  wherein distributing the segment bundling table comprises distributing the checksum to the traffic forwarding devices in the network so as to verify consistency in the segment bundling table, and
  further comprising:
    incorporating the checksum into a link state packet;
    distributing the link state packet to the traffic forwarding devices; and
    verifying, by the traffic forwarding devices, based on the checksum, that the segment bundling table previously received by the traffic forwarding devices is consistent with a traffic forwarding device that sent the link state packet.

* * * * *